June 25, 1968  R. O. COUCH ETAL  3,390,225

UNDERGROUND ELECTRICAL VAULT

Filed March 28, 1966  3 Sheets-Sheet 1

INVENTOR.
ROBERT O. COUCH
DAVID L. WYATT
BY *Watts & Fisher*, attys

June 25, 1968     R. O. COUCH ETAL     3,390,225
UNDERGROUND ELECTRICAL VAULT
Filed March 28, 1966                         3 Sheets-Sheet 2
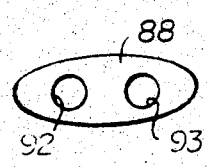
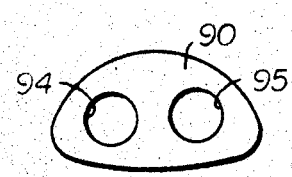
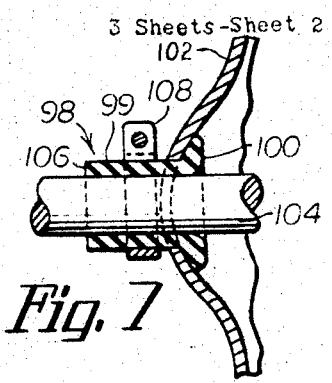
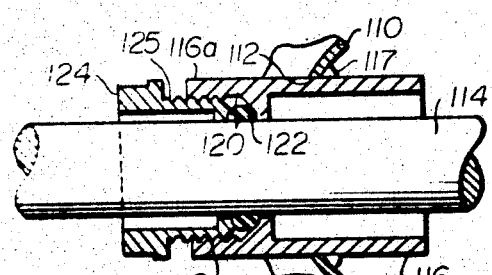
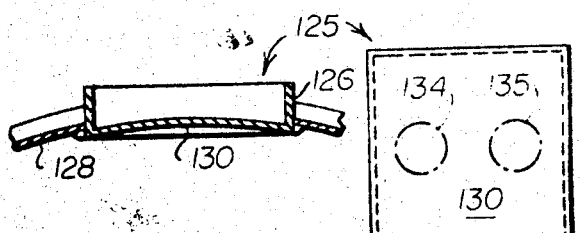
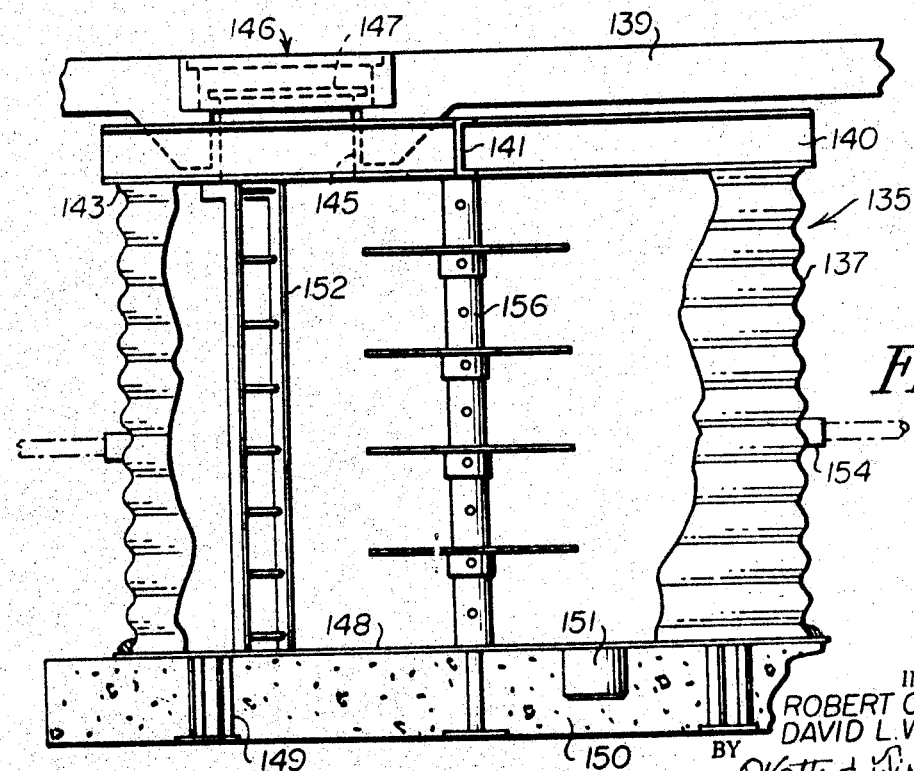
INVENTOR.
ROBERT O. COUCH
DAVID L. WYATT
BY Watts & Fisher, attys.

INVENTOR.
ROBERT O. COUCH
DAVID L. WYATT
BY
Watts & Fisher, attys.

United States Patent Office 3,390,225
Patented June 25, 1968

3,390,225
UNDERGROUND ELECTRICAL VAULT
Robert O. Couch, Wadsworth, and David L. Wyatt, Akron, Ohio, assignors, by mesne assignments, to New England Realty Co., Barberton, Ohio, a corporation of Ohio
Filed Mar. 28, 1966, Ser. No. 537,886
7 Claims. (Cl. 174—37)

ABSTRACT OF THE DISCLOSURE

Underground containers or vaults of helically corrugated metal. Also, vaults formed of two telescoped tubes concentrically arranged and spaced from each other with a foam filler. Openings are provided in side walls for conduits and the like. Covers, including grates with spaced baffle members, are provided and a grate can extend across the container to provide upper and lower zones.

---

This invention relates to vaults or manholes, particularly to vaults or manholes used for housing electrical equipment in the ground.

At the present time, most existing electrical distribution equipment, for example power distribution lines, telephone systems, etc. are above ground. As a result, they require poles and unsightly wires. These and other equipment are exposed to view. Recently, there has been a rapidly growing trend to place such electrical distribution equipment below ground. This is not only desirable from the standpoint of appearance, but also because it reduces maintenance problems by protecting the wires and equipment from severe weather. In addition, it is known that switches function better on underground lines than on aerial lines. As a result, maintenance costs and replacement costs are greatly reduced. Still further savings are being provided by utilizing a common trench for both electrical utility lines and telephone lines, separated by two or three feet in elevation.

With new underground electrical distribution systems, such equipment as telephone switching gear, electrical meters and utility or power transformers must be housed in a protected and accessible manner beneath the ground. This is best accomplished by utilizing a vault or manhole in which the equipment is placed and through which the lines of electrical distribution are connected.

Underground manholes or vaults of various types have been known and used in conjunction with conduit systems in the past. For example, masonry or prefabricated manholes have been used with fluid conveying systems and in underground electrical conduit systems as well. Generally, such manholes have been complex, expensive, or fabricated at the site of installation.

Heretofore, attempts at low cost vaults suitable for underground electrical systems have not been completely satisfactory. For example, low cost fiber material vaults lack strength, particularly in large sizes. Moreover, they are often damaged by back filling during installation. As a result, moisture finds its way through such damaged portions into the fiber material, causing further loss of strength and deterioration. Moreover, the construction of such vaults does not lend itself well to securely anchoring the vault in place within the ground. Furthermore, the material of the vault is such that it does not readily dissipate heat that may be generated by the electrical equipment within.

The above and other disadvantages of known underground vaults and manholes have been overcome by the present invention.

In conventional terminology, a vault is of small size, large enough only for equipment. A manhole designates vaults of a size that will permit a man to enter the vault. As used herein, the term "vault" is intended to include vaults of all sizes, including so-called manholes.

In accordance with the present invention, an improved vault is provided that is strong, durable, low cost, simple in construction and which dissipates heat very readily. The vault remains anchored in the ground, resisting settling, floating, or other forces tending to change its elevation.

Briefly, the above advantages are achieved by a construction that utilizes a corrugated tubular wall oriented vertically in the ground. The tube is open at both ends and a lower end rests directly on a porous base in the ground, such as on a layer of gravel. A perforated cover, such as a grate is placed over the top of the tube at ground level to prevent the entrance of foreign material. Side openings are provided in the vertical wall for the connecting conduits of the underground system.

The corrugated tubular metal wall of the vault is not only extremely strong, but the corrugations provide three additional important features: (1) The corrugations provide an irregular surface that strongly resists tendencies of the tubular member to move axially within the earth. As a result, the vault does not tend to settle, float or otherwise shift in the manner a smooth vault tends. (2) The corrugations are preferably spiral, i.e., helical, and, if the vault is rotated about the central vertical axis, they act as screw threads. Thus, if the vault should settle or lift from the ground, it may be rotated, causing it to change elevation to a desired extent. (3) The corrugations provide a marked increase in the area of the tubular wall over a comparable diameter smooth wall. As a result, the ability of the tubular wall to dissipate heat generated within by the electrical power equipment is materially enhanced.

A metal vault provides high strength. Yet with the present construction the cost is maintained low. Moreover, the metal conducts away heat generated by power equipment within the vault. As a further advantage, it facilitates the attachment of support brackets and other metal parts directly to the wall surface by welding, so that the side wall need not be perforated unnecessarily.

Where power equipment, such as transformers, which produce an appreciable amount of heat, are to be housed within the vault, the vault must be provided with sufficient space around the housed equipment to facilitate sufficient circulation of air. By the same token, the perforated cover or grate must provide openings of sufficient area to allow the air to circulate within the vault in adequate amounts. In accordance with the present invention, a vault is constructed of a cross sectional area sufficiently greater than the cross sectional area of the electrical equipment to be housed and with a grate of sufficient open area so that the quantity of heat generated by the electrical equipment is dissipated by convection and by conduction through the vault walls. By this appropriate design, the temperature within the vault is maintained within a desired temperature range for normal ambient conditions.

It is contemplated that the vault may be circular or of a shape other than circular. For example, with a plurality of pieces of equipment it is contemplated that the vault may be elliptical in shape or may approach a semi-circular shape to best provide the maximum internal space for the equipment to be housed.

Where it is contemplated that the equipment housed will generate an abnormal amount of heat which must be dissipated, fins are provided on the side wall of the vertical tube. Such fins may be located on either the inside, outside, or both surfaces of the tubular wall. When such fins are located on the outside surface, they conduct heat directly from the vault to the surrounding ground. They perform the additional function of firmly anchoring the vault in the ground, resisting movement in an axial direction. Preferably, the fins are angled to the same extent as the spiral corrugations to facilitate vertical adjustment of the vault by rotation of the vault.

In many instances, it is desirable for high voltage power applications to insulate the vault. In one embodiment, the vault of the present invention is provided with an insulating lining on the inside surface of the vertical tube. A polyurethane coating is particularly suitable for this purpose.

As mentioned earlier, one approach to underground electrical distribution is to use a common trench for both electric utility lines and telephone lines. In that case, the lines will be separated in elevation by several feet. An embodiment of this invention is provided that is particularly useful for such an arrangement. This embodiment utilizes a vault of substantial depth that will accommodate a man. Midway across the vault there is provided a horizontal grate that can be pivoted or otherwise removed from position. Electrical utility equipment may be located on one side of the grate and telephone equipment on the other (i.e., above and below the grate). The grate provides a convenient platform for maintenance men when working on the equipment in the upper portion of the vault and yet provides ready access to the lower portion of the vault. In addition, it allows free circulation of air within the vault for adequate cooling.

In order to protect the equipment housed within the vault, the top grates are provided with a baffle arrangement that prevents direct access to the equipment from outside the grate. A particularly convenient arrangement is provided, whereby spaced baffles are carried directly by the grate so that removal of the grate also removes the baffles, providing quick and direct access to the vault and housed equipment.

Where low cost is of primary concern and heat transfer considerations are not important, a modified vault construction has been provided that couples substantial strength with low cost materials and simple construction. This embodiment is constructed of two telescoped tubes spaced somewhat from each other, preferably concentrically arranged. The tubes have open bottoms and tops and are provided with a top grate, or cover. Ideally, the tubes may be constructed of fiberboard coated with a suitable preservative and sealer or of thin metal. The inner tube wall is spaced from the outer surrounding tube wall and the space is filled with a foam material, such as urethane foam to maintain the spacing and to provide structural strength. Where desired, additional strength is provided with a corrugated or nodal spacing ring interposed between the two concentric tubes and constructed to contact the outer surface of the inner tube and the inner surface of the outer tube. Not only is a strong vault provided, but also, even if the outer wall is damaged, the inner wall will remain firm and strong.

These and other features and advantages, and the various embodiments of this invention will all become better understood by reference to the following detailed description, when considered in conjunction with the accompanying drawings, in which:

FIGURE 5 is a diagrammatic plan view of an alternative shape of a vault similar to the vault of FIGURE 1;

FIGURE 6 is a diagrammatic plan view of a vault similar to FIGURE 1, showing a further alternative shape;

FIGURE 7 is a sectional view through a side wall of a vault constructed as in FIGURE 1, showing details of a hose-type seal and clamp surrounding a cable passing through a side wall of the vault;

FIGURE 8 is a sectional view of another embodiment of a seal in the form of a gland at an opening in the side wall of the vault;

FIGURE 9 is a sectional view of an entry opening box in a vault side wall to facilitate a future opening for additional conduits;

FIGURE 10 is an elevational view of the entry opening box of FIGURE 9;

FIGURE 11 is an elevational view with parts broken away of another embodiment of a vault constructed in accordance with the present invention;

Figure 1:
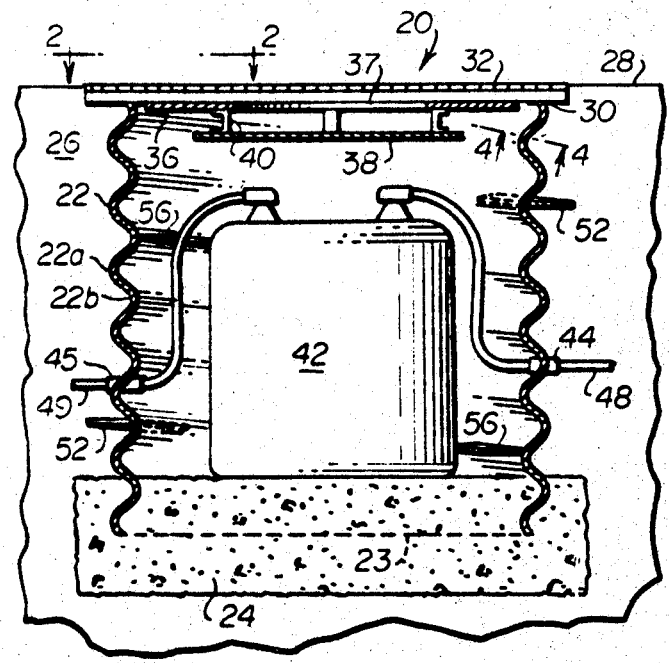
FIGURE 1 is an elevational view with parts broken away and parts in section showing one embodiment of a vault constructed in accordance with the present invention.

With reference now to the drawings, there is shown in FIGURE 1 a vault indicated generally at 20. The vertical walls of the vault 20 are formed of a corrugated, tubular steel member 22. In this embodiment, the tubular member 22 is circular in horizontal cross section and the corrugations 22a, 22b extend generally horizontally, in a spiral (i.e., helical) path, around the circumference of the wall 22. A bottom end 23 lies in a horizontal plane at right angles to the central longitudinal axis of the vault 20. The bottom end 23 is open and rests on a bed of porous material, such as gravel 24. Earth or soil 26 surrounds the wall 22. The upper surface or grade of the soil 26, indicated at 28, is essentially level with an upper end 30 of the tubular member 22.

Figure 2:
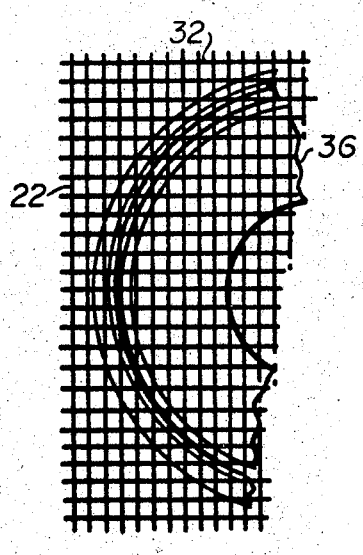
FIGURE 2 is a fragmentary plan view of the grate from the plane 2—2 of FIGURE 1, and looking in the direction of the arrows.

A grate 32, in the form of a grid best shown in FIGURE 2, extends across the upper end 30 of the tubular member 22, resting on the upper edge and providing a cover that permits circulation of air between the zone above the ground level 28 and the interior of the vault 20.

A baffle indicated generally at 34 is fastened to the lower surface of the grate 32, as by welding. The baffle 34 includes an annular plate 36 directly adjacent the grate 32 and of an outer diameter approximately equal to the diameter of the tubular member 22. A large central opening 37 is provided in the plate 36. A circular baffle plate 38 is suspended beneath the central opening 37 by brackets 40 from the plate 36. The circular baffle plate 38 is spaced below the plate 36 a substantial distance to provide a large passageway for the circulation of air around the perimeter of the plate 38, between plates 38 and 36 and through the central opening 37. Thus, the baffle provides for the circulation of air while effectively blocking the interior of the vault 20 from direct access through the grate 32. This protects the equipment, such as the transformer 42 shown within the vault 20, from damage from objects poked through or that fall through the grate 32.

A transformer 42 or other electrical equipment rests on the gravel 24 at the lower end 23 of the tubular member 22. Access for cables to the transformer 42 is provided through side openings 44, 45 in the tubular member. The openings 44, 45 are constructed with a suitable seal surrounding cables 48, 49 that pass through the openings, to prevent the entrance of foreign material into the tubular member.

As shown in FIGURE 1, there is substantial space between the transformer 42 and the tubular member 22 for the circulation of air. This space for circulation, coupled with the capacity of the metal wall 22 to conduct away heat to the surrounding ground 26, provides cooling for the transformer 42. The volume of the surrounding space as well as the area of the openings in the grate 32 are correlated with the quantity of heat normally generated by the particular electrical equipment housed, so that the temperature within the vault 20 is maintained below a predetermined temperature for a given ambient temperature. In this manner, the transformer 42 is prevented from overheating.

Optional outer fins 52, in the general form of rectangular plates welded or otherwise secured to the outer wall of the tubular member 22, extend in a generally horizontal plane, but angled to correspond with the spiral direction of the corrugations. These optional fins 52 serve the multiple purposes of (1) dissipating heat from the vault 20; (2) resisting axial movement of the vault in the earth 26; and, (3) acting as screw threads along with the corrugations in the event vertical adjustment is to be made of the tubular member 22 by rotation about the central vertical axis.

Either the corrugations alone or the corrugations and the fins 52 facilitate vertical adjustment, in the event it is necessary, in the following way: The diameter of the vault 20 may be spanned with a two-by-four, crow bar, or other member and either manually or mechanically rotated within the ground 26. The spiral corrugations and the fins 52 cause the tubular member 22 to move upward or downward in the ground in response to the rotation.

Optional inner fins 56 can be secured to the inside surface of the tubular member 22 as shown in FIGURE 1 for further heat dissipation. These fins increase the effective area of the side wall of the vault 20 and dissipate heat, which is then carried away by the convection flow of air through the grate 32.

Figure 3:
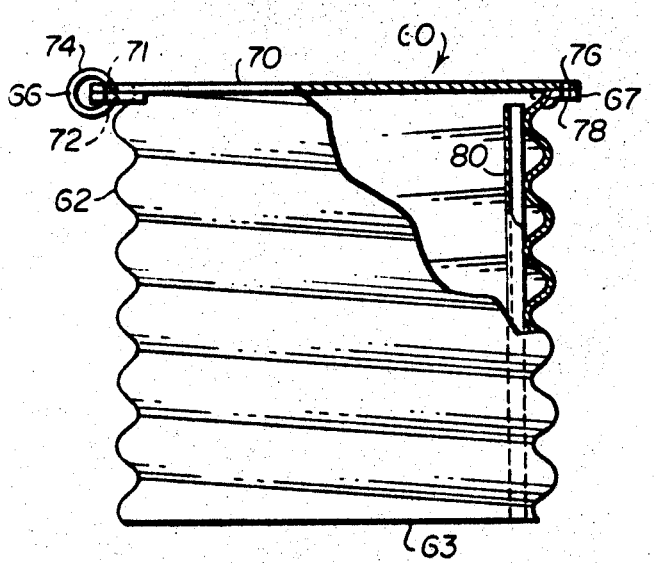
FIGURE 3 is an elevational view, with parts broken away and in section of an alternative embodiment of a vault constructed in accordance with the present invention.

Another embodiment of a vault constructed in accordance with this invention is indicated at 60 in FIGURE 3 of the drawings. This vault is similar to the vault 20 but is particularly adapted for electrical equipment that generates little if any heat, such as switches or meters. The vault 60 is formed of a corrugated tubular member 62, preferably circular in plan and with spiral corrugations. This vault 60 has an open, bottom end 63 and is supported in the ground in the same manner as the embodiment of FIGURE 1.

Two diametrically opposite extending ears 66, 67 are secured at an upper end 68 of the tubular member 62. A solid circular cover 70, rests on the upper edge 68 and overlies the two ears 66, 67. An aperture 71 near the peripheral edge of the cover 70 overlies an aperture 72 in the ear 66. A ring 74 passes through the two apertures 71, 72 fastening the cover 70 to the tubular member 62 in a manner that allows the cover 70 to be swung open. An aperture 76 is provided in the cover 70 diametrically opposite from the aperture 71. This aperture overlies an aperture 78 in the ear 67. The cover 70 may be secured in position by inserting a suitable fastener through the apertures 76, 78.

A vertical channel 80 is shown within the vault 60 and is of a typical construction that has a plurality of slots for mounting brackets or equipment to it. The vertical channel 80 is secured to the inner wall of the tubular member 62, as by welding. With this arrangement, a plurality of pieces of equipment can be supported vertically spaced from each other and secured to the vault in a desired location and orientation.

Figure 4:
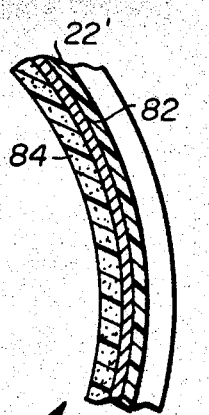
FIGURE 4 is a fragmentary section of a vault, as along the line 4—4 of FIGURE 1, on an enlarged scale, showing inner and outer coatings on a corrugated wall of a vault.

FIGURE 4 represents a transverse partial sectional view of a vault such as that shown in FIGURE 1 or FIGURE 3 and as would be seen from the plane of 4—4 of FIGURE 1. The view discloses a corrugated tubular wall 22′ having an outer coating 82 and an inner coating 84. The outer coating 82 is an asphalt protective coating that prevents the metal of the wall 22, which is preferably galvanized steel, from corroding in the soil.

The inner coating 84 on the wall 22 is an electrically insulating coating, such as polyurethane, that is desirable in high-voltage utility applications. Either coating may, of course, be used without the other.

In some instances it is desirable that the vault be shaped other than circular even though the advantage of vertical adjustment by rotation of the vault is lost. Two such different shapes are shown in FIGURES 5 and 6 of the drawings. In FIGURE 5, a vault 88 is shown of oval or elliptical configuration, and in FIGURE 6 a vault 90 is shown of somewhat semi-circular configuration formed by deforming a circular tubular member. Two pieces of electrical equipment 92, 93 in vault 88 and 94, 95 in vault 90 illustrate the desirability of the modified configurations. In both cases, the configuration provides increased and generally more uniform spacing around each piece of electrical equipment than would be provided with the same equipment in a circular vault of the same wall area.

Two arrangements for providing fluid-tight seals at openings in the side wall portion of a vault are shown in FIGURES 7 and 8. The seal is provided around a cable extending through the wall and communicating from within the vault to the outside. Such cable is normally buried beneath the ground.

FIGURE 7 shows a flexible seal indicated generally at 98. The flexible seal 98 includes a thin, rubber boot or tube 99. The boot 99 has an end flange 100 located within a corrugated tubular wall 102 of a vault constructed in accordance with the present invention. The boot 99 extends through an opening 103 in the wall 102. The flange 100 is suitably sealed, as by an adhesive, with the inner surface of the wall 102. The tubular portion of the boot 99 extends outward, through the opening 103 and surrounds a cable 104 through the opening. The boot 99 terminates at an outer end 106, a short distance from the wall 102. A clamp or seal, such as a hose clamp 108, encircles the boot 99 and cable 104, providing a circumferential seal about the cable. The flexibility of the rubber boot 99 permits the cable to contract, expand or otherwise flex and adjust for stresses.

An alternative seal construction is shown in FIGURE 8. In this embodiment, a wall 110 of a vault has a circular opening 112 through which a round cable 114 passes. A circular metal sleeve 116 extends through the opening 112 and is welded about the perimeter of the opening, as at 117. An inner end 116a of the sleeve 116, located within the associated vault, has internal threads 118 and an adjacent tapered annular seating surface 120.

An annular gasket 122 tightly surrounds the cable 114 adjacent the tapered sealing surface 120. A gland 124 having external threads 125 is received by the internal threads 118 in the end 116a of the sleeve. The gland compresses the gasket 122 into fluid-tight relationship with the seat 120 and cable.

In many instances it is desirable to provide a vault with facilities for future cables to be connected with electrical equipment within the vault. To this end, an entry frame 125 in the form of a rectangular open box is provided in an opening 126 of corresponding shape in the tubular corrugated wall portion 128 of a vault constructed in accordance with the present invention. The entry frame 125 has a surface 130 that generally spans the opening 126 and is inset somewhat from the tubular wall 128. The surface 130 is surrounded by a steel frame in the form of a peripheral wall that extends from the surface 130 outwardly of the vault wall 128. This allows the wall portion 130 of the entry frame 125 to be relatively smooth or flat rather than follow the corrugated contour of the wall 128. At the same time, the frame 132 provides a continuous seal with the corrugated wall 128. The location at which cable seals may be provided in the wall portion 130 is shown in dotted line at 134 and 135. If desired, scored knock-out portions may be provided at locations 134, 135.

A vault of more complex construction and of relatively large size is indicated at 135 in FIGURE 11 of the drawings. The vault 135 is comprised of a vertical, corrugated, tubular metal wall 137. As shown, the vault 135 is located beneath a concrete paving strip 139.

Crossed structural channels 140, 141 extend across an upper rim or edge 143 of the tube 137 to support the heavy load above. Access to the top of the vault 135 is provided through an access opening 145 beneath a manhole frame and cover 146 in the concrete paving strip. An inner flange manhole cover 147 is provided over the access opening 145.

A steel bottom plate 148 extends across the lower end of the tubular wall 137. A plurality of setting legs and pad anchors 149 extend downward from the lower surface of the bottom plate 148 and are anchored in a concrete flotation pad 150. A sump 151 is provided in the bottom plate 148 to collect any water from condensation or leakage. A ladder 152 provides access to the bottom of the manhole through the access opening 145. Side wall openings 154 are provided through the tubular wall 137 for cables connected with the electrical equipment within the manhole or vault 135.

A central supporting pipe 156 is provided between the bottom of the manhole and the cross channels 140, 141 for additional support. Adjustable trays and cable supports are supported on the pipe. The pipe provides the additional function of acting as an anchor for cable pulling tools.

Figure 12:
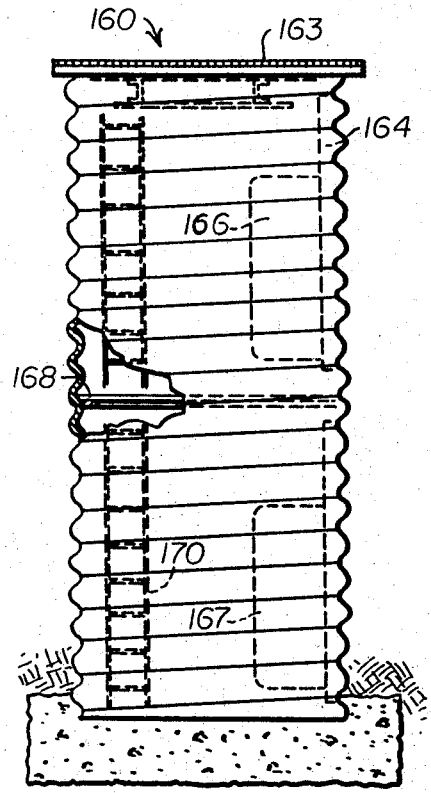
FIGURE 12 is an elevational view of a vault constructed for use with a common trench for both electrical utility lines and telephone lines, providing a center grate or platform dividing the vault into upper and lower portions.

Another embodiment of a vault construction in accordance with this invention is shown at 160 in FIGURE 12 of the drawings. This vault extends a substantial distance vertically and is advantageously constructed of corrugated tubular galvanized steel. As in the embodiment of FIGURE 1, the tubular wall 162 is open at the bottom and rests on a bed of gravel or other porous material. The upper end of the tubular wall 162 is open and covered with a grid and baffle 163.

A vertical channel 164 of the type described in conjunction with FIGURE 3 extends along one portion of the tubular wall 162 and supports two vertically spaced pieces of electrical equipment 166 and 167. By way of example, the upper piece of electrical equipment 166 may suitably be used in conjunction with electric utility lines and the lower piece of electrical equipment 167 may be used with telephone lines. The connected lines can then extend in a common trench.

For convenience in assembly and servicing, a central horizontal grate 168 extends transversely within the tubular wall 162 at approximately the mid plane of the vault. Because the vault 160 is of a large size, a man may enter the vault and stand on the grate 168 while servicing or installing the electrical equipment 166. The grate 168 or a portion thereof may be removed to allow access to the lower half of the vault 160 via the ladder 170.

Figure 13:
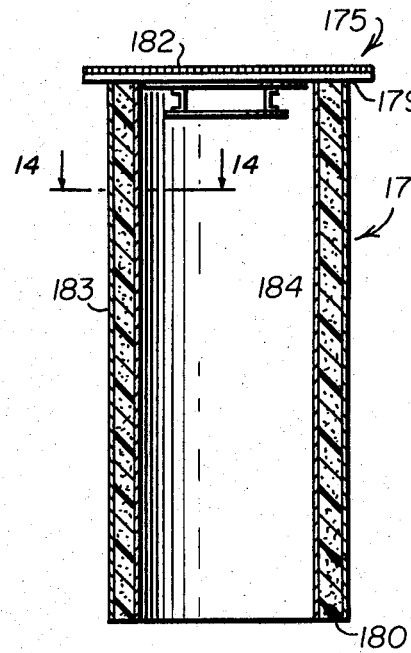
FIGURE 13 is a diagrammatic sectional view of a vault constructed with two concentric spaced walls with a layer of foam between the walls.

A vault 175 of modified construction is shown in FIGURE 13 of the drawings. This vault is designed to provide a low-cost, durable, vault of relatively high strength considering the materials of which it is made. It is particularly suitable where cost is an important factor and heat conduction is not of primary importance.

The vault 175 is in the form of a vertical, tubular wall indicated generally at 178, open at both an upper end 179 and a lower end 180. As in the embodiment of FIGURE 1, the lower end 180 rests on a bed of porous material, such as gravel. A grate and baffle member 182 is indicated diagrammatically at the upper end of the tubular wall 178.

Figure 14:
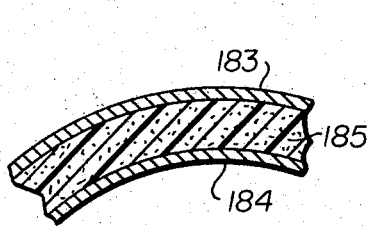
FIGURE 14 is a transverse sectional view of the vault of FIGURE 13, taken along the lines 14—14 and looking in the direction of the arrows.
Figure 15:
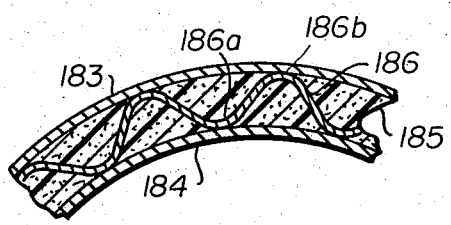
FIGURE 15 is a transverse sectional view of a modified vault similar to that of FIGURES 13 and 14, having a corrugated spacing member between the concentric walls.

The construction of the wall 178 is best shown in FIGURE 14 of the drawings. It is formed of an outer tubular wall 183 and an inner tubular wall 184. The inner wall 184 is concentric with the outer wall 183. The inner tubular wall 184 has a sufficiently smaller diameter than that of the outer tubular wall 183 so that a substantial space is provided between the two walls. This space is filled with a foam, such as a urethane foam, indicated at 185 that maintains the walls in fixed, spaced relationship and substantially increases the rigidity and strength of the walls.

Where additional strength and rigidity is desired, the vault 175 may be constructed in the manner shown in FIGURE 15 of the drawings. In that modified form, a nodal or corrugated ring 186 surrounds the inner wall 184 within the outer wall 183. Spaced nodes 186a and 186b contact the inner and outer walls, respectively, at spaced intervals. The volume on opposite sides of the inner ring 186 between the walls 184, 185 is filled with foam, as in the embodiment of FIGURE 14.

While in the foregoing disclosure certain preferred embodiments have been disclosed, numerous modifications or alterations may be made therein without departing from the spirit and scope of the invention as set forth in the appended claims.

What is claimed is:

1. A container or vault for forming a wall that encompasses and houses electrical equipment or the like in the ground, comprising a tubular wall, helically corrugated throughout its length, circular in transverse cross section, and adapted to be oriented vertically in the ground with an upper end of the vertical wall adjacent the surrounding grade, said tubular wall being open at both ends, said helical corrugations providing increased inside and outside surface area and rigidity as compared with a straight walled container and facilitating axial adjustment of the container in the ground in response to rotation of the container, and a cover across the upper open end of the wall said cover being secured to permit opening for access to within the tubular wall through the upper end when the wall is oriented vertically in the ground.

2. The container of claim 1 including a plurality of separate essentially flat fins secured to and extending from the outside surface of the tubular wall and inclined relative to the central axis of the tube to follow the direction of the corrugations.

3. The container of claim 1 wherein the tubular wall is formed of galvanized steel, and including a layer of polyurethane insulation adhered to the inside helically corrugated surface of the wall and an asphalt protective coating on the outside surface of the wall to inhibit corrosion of the wall.

4. The container of claim 1 including a water-tight cable seal connected with the side wall of the tube at a side opening to provide a seal between the opening and a cable that passes through the opening, a cable entry frame located in an opening in the side wall of the tube sealing the opening and providing a location for future openings and seals through the side wall of the tube, and a protective coating on the outside surface of the tube.

5. The vault of claim 1 in combination with electrical equipment within the vault that generates heat during use, the vault being constructed of a cross sectional area sufficiently larger than the horizontal cross sectional area of electrical equipment to be placed in the vault, the cover being a grate with a plurality of small openings and having a spaced baffle secured beneath it to provide only an indirect path of opening through the grate to the inside of the vault, and the openings in the grate being of a sufficient area correlated with the quantity of heat to be generated by the electrical equipment, to allow sufficient circulation of air by convection within the vault and through the grate to maintain the temperature within the vault below a predetermined temperature for a given ambient temperature.

6. A bi-level manhole that is tubular in shape and that extends vertically in the ground to service separate conduits spaced vertically in the ground, said manhole being formed of a corrugated metal tube substantially greater in axial length than in diameter, a first grate within the tube extending across the tube axis and separating the tube into upper and lower sections adjacent buried conduits at two different levels in the ground, said grate being removably supported to permit access through the top of the manhole to the lower section, side openings in the manhole to receive conduits buried in the ground, a cover over the top of the manhole, said cover being in the form of a second grate with a spaced baffle secured to the underside thereof to provide only an indirect path of opening through the cover, and a vertical support along one inner portion of the tube to support two vertically spaced pieces of equipment, one above the said first grate and one below.

7. A container for housing electrical equipment or the like in the ground, comprising a tubular corrugated wall adapted to be oriented vertically in the ground with an upper end of the vertical wall adjacent the surrounding grade, said tubular wall being open at both ends; a cover across the top opening of the tubular wall removably secured to permit access to within the tubular wall through the upper end when oriented vertically; at least one aperture through the tubular wall to provide a passageway through the side of the container; a channel welded along the inside of the tubular wall to support electrical equipment within the vault; a center pole oriented axially in the center of the tube, of a length that extends from the ground beneath the vertical tube to the grate over the upper opening and adapted to form a central support, said pole being secured in spaced relationship from the tubular walls to provide an anchor for cable pulling tools; a water-tight cable seal connected with the side wall of the tube at a side opening to provide a seal between the opening and a cable that passes through the opening; a cable entry frame located in an opening in the side wall of the tube, sealing the opening and providing a location for future openings and seals through the side wall of the tube; and an asphalt coating on the outside surface of the tube.

References Cited

UNITED STATES PATENTS

| | | | |
|---|---|---|---|
| 261,649 | 7/1882 | Apple | 52—20 X |
| 411,595 | 9/1889 | Hyland | 174—16 |
| 413,215 | 10/1889 | Warde | 174—39 |
| 620,588 | 3/1899 | Hoppes | 137—370 X |
| 992,377 | 5/1911 | Moore | 137—370 X |
| 1,131,078 | 3/1915 | Pickles | 94—37 |
| 1,265,767 | 5/1918 | Fouts. | |
| 1,793,038 | 2/1931 | Zimmerman | 94—34 |
| 2,100,721 | 11/1937 | Parsons | 174—37 X |
| 3,271,710 | 9/1966 | Leonard | 174—16 X |

FOREIGN PATENTS

| | | |
|---|---|---|
| 672,647 | 10/1963 | Canada. |
| 605,438 | 2/1926 | France. |

LARAMIE E. ASKIN, *Primary Examiner.*